US006791481B2

(12) United States Patent
Altare et al.

(10) Patent No.: US 6,791,481 B2
(45) Date of Patent: Sep. 14, 2004

(54) PORTABLE CD-ROM/ISO TO HDD/MP3 RECORDER WITH SIMULTANEOUS CD-READ/MP3-ENCODE/HDD-WRITE, OR HDD-READ/MP3-DECODE, TO PLAY, POWER SAVING BUFFER, AND ENHANCED SOUND OUTPUT

(75) Inventors: William Christopher Altare, Oceanside, CA (US); Anton N. Handal, El Cajon, CA (US)

(73) Assignee: Echo Mobile Music, LLC, San Diego, CA (US)

( * ) Notice: Subject to any disclaimer, the term of this patent is extended or adjusted under 35 U.S.C. 154(b) by 17 days.

(21) Appl. No.: 09/860,935

(22) Filed: May 18, 2001

(65) Prior Publication Data

US 2002/0171567 A1 Nov. 21, 2002

Related U.S. Application Data

(60) Provisional application No. 60/205,936, filed on May 18, 2000.

(51) Int. Cl.[7] ................................................ H03M 5/00
(52) U.S. Cl. ............................................. 341/55; 369/7
(58) Field of Search ................................. 341/55; 369/1, 369/2, 6, 9–10, 7–8, 11–12; 704/500

(56) References Cited

U.S. PATENT DOCUMENTS 6,061,306 A * 5/2000 Buchheim ...................... 369/2
6,292,440 B1 * 9/2001 Lee ............................... 369/7

* cited by examiner

Primary Examiner—Brian Young
Assistant Examiner—Joseph Lauture
(74) Attorney, Agent, or Firm—Fuess & Davidenas

(57) ABSTRACT

A combination CD-ROM and MP3 recorder/player playing a CD-ROM decodes 16-bit ISO standard code words into an audio wave form converts this wave form to sound while encoding and digitizing the wave form into 24-bit MP3 format digital data. To conserve power the MP3 data is buffered in a solid state memory, preferably of the FLASH or DRAM type, before being written to a hard disk. Both reading of the CD/ROM and encoding the read contents as MP3 data, and interchange of MP3 data with other recorder/players, can be accomplished at greater than real-time play rates, permitting that, most typically, some 1200+ musical works can transferred expediently.

15 Claims, 5 Drawing Sheets

PORTABLE CD-ROM/ISO TO HDD/MP3 RECORDER WITH SIMULTANEOUS CD-READ/MP3-ENCODE/HDD-WRITE, OR HDD-READ/MP3-DECODE, TO PLAY, POWER SAVING BUFFER, AND ENHANCED SOUND OUTPUT

RELATION TO A PROVISIONAL PATENT APPLICATION

The present patent application is descended from, and claims benefit of priority of, U.S. provisional patent application Ser. No. 60/205,936 filed on May 18, 2000 for an ECHO MUSIC SYSTEM to inventors including the self-same Chris Altare who is the inventor of the present patent application.

BACKGROUND OF THE INVENTION

1. Field of the Invention

The present invention generally concerns CD-ROM and MP3 player-recorders, especially as may be (i) combined and (ii) portable.

The present invention particularly concerns (ii) simultaneous encoding and recording of MP3 files on a Hard Disk Drive (HDD) derived from a CD-ROM while playing the CD-ROM, and the subsequent playing of MP3 files from a HDD; (ii) conservation of power in combination CD-ROM and MP3 player-recorders; (iii) enhanced sound output from CD-ROM and MP3 player-recorders; (iv) retrospective initiation of recording, (v) and computerless high-speed transfer between MP3 player-recorders.

2. Description of the Prior Art 2.1 Encoding/Recording MP3 Files On, and Playing MP3 Files From, a Hard Disk Drive (HDD)

Portable CD-ROM players having been around several years, portable players of MP3 files have recently (circa 2001) become popular. Some portable player-recorders are capable of dealing with both CD-ROM and MP3 media, as the player-recorder of the present invention will prove to be capable of. However, in order to encode MP3 from CD-ROM in real time, a processor/microprocessor of considerable capability has heretofore been required, making that this process has normally been performed in computers, and limiting the application of the necessary processing power to portable units, especially as may be powered by batteries.

The combination portable CD-ROM and MP3 player-recorder of the present invention will be seen not only to use a new low-power MP3 encoder/decoder chip that permits the encoding of MP3 words at rates equal to and greater than normal play speeds, but to use this chip flexibly, and to new ends of creating MP3 digital words that are not of the same bit-width, and sound quality, as are the digital words of a compressed ISO standard CD-ROM which these MP words serve to supplant.

Additionally in the prior art, some units, not normally portable and often associated with computers as drives, are capable of duplicating MP3 format media at greater than normal playback speeds. However, due to requirements for extensive computer resource for the reading and writing of necessary files, this level of function has not heretofore been deemed realistically realizable with a portable, battery-powered, MP3 player-recorder.

2.2 Conservation of Power in CD-ROM and MP3 Player-Recorders, Including in Combination CD-ROM and MP3 Player-Recorders It has been recognized that power may be conserved in CD-ROM and MP3 player-recorders, and in combination CD-ROM and MP3 player-recorders, by the simple expedient of turning off functional sections of the device, especially rotating devices such as CD-ROM and hard disk drives, when not in use.

However, little attention has been given to designing a combination CD-ROM and MP3 player-recorder form "the ground up" so as to minimize the uses, and the durations of uses, or high-powered sections at the possible costs of new sections, and/or the longer and/or new uses of lower-powered sections. The present invention will be seen to employ (i) a semiconductor memory in combination with both of (ii) a CD/ROM player, and also a (iii) hard disk drive for both recording and playing, to the particular purpose of minimizing the time that both the (ii) CD/ROM player, and the (iii) HDD are operative, consuming power, during normal player-recorder functions.

2.3 Retrospective Initiation of Recording In, and Computerless High-Speed Transfer Between, MP3 Player-Recorders The concept that something that is being played, such as a tract on a CD-ROM, could selectively, retrospectively, be chosen to be saved, or not to be saved, mandates that there is something to save resulting from the playing, to wit: a file. The creation, and the storage, of MP3 encoded files has in the past most normally required, respectively, (i) the action of a processor or microprocessor running an operating system having instructions or microcode most normally resident on, and read from, a HDD, along with (ii) the lodging of files on a HDD. The running of both a processor/microprocessor and a HDD has deemed to be so energy intensive in a portable, battery-powered device, that no accommodation has been given to "retrospectively throwing away" a just-made MP3 file. At best the user/listener can go and delete, usually from a HDD, the file just made.

The present invention will show how to make an MP3 file in a portable, battery powered, with such energy economy that it is not detrimental to listen to a CD-ROM, selectively retrospectively keeping certain MP3 files newly encoded from selected tracks of the CD-ROM while completely discarding other newly encoded MP3 files as represent other, unwanted, tracks.

2.4 High-Speed RIP of a CD/ROM

Taking the digital contents of an audio (as opposed to a data) CD/ROM into one or more MP3 format files stored upon a computer has been a task requiring considerable computer "horsepower", and has thus been but seldom performed by computers, and, with the seemingly considerable required energy, never (to the best knowledge of the inventors) by portable, battery-powered, combination CD/ROM and MP3 player-recorders. The present invention will be seen to overcome the previous limitations, including in areas of processing and storage and power, in this process by (i) managing the rotating times of disk drives carefully, (ii) buffering CD/ROM data until suitably encoded as MP3, and (iii) again buffering the MP3 data until suitably recorded on a HDD. Everything goes along reasonably speedily at about 4x–6x normal read speed because, inter alia, there is no processor/microprocessor and no operating system and no instructions involved—as is conventional. Instead, the entire MP3 encoding will be seen to be done in a single chip, and the management of all data transfer in another, file manager, chip.

2.5 Computerless High-Speed Transfer Between MP3 Player-Recorders

High speed transfer of files, such as MP3 files, requires some measure of correlation in speed of transmit and receive, and some buffering. Heretofore MP3 Player-recorders have been routinely connected to computers for bi-directional transfer of MP3 files in accordance with the greater speed, and buffer capacity, of the computer, but it has not been realized to transfer MP3 files between portable player-recorders themselves, without benefit of any computer.

SUMMARY OF THE INVENTION

In several of its disparate aspects the present invention contemplates an improvement to the sequence of:

1) first-converting at a first time successive first-bit-length first-encoded first digital words to a first analog signal;
2) first playing at the first time this first analog signal through speakers or headphones or the like to the human ear, while also
3) second-encoding and re-digitizing, preferably at the first time, this first analog signal into a successive second-bit-length second-encoded second digital words, followed by
4) storing these second digital words until, at a later second time,
5) second-converting the second digital words into a second analog signal, and
6) second playing also at the second time this second analog signal through speakers or headphones or the like to the human ear.

The present invention contemplates, inter alia, (1) (re-)encoding an audio wave form (for later playback) in a longer code word, and better encoding format, than that word and format in which the audio wave form was initially encoded; (2) conserving power in a portable CD-ROM and MP3 player-recorder by various strategies of (2a) minimizing data references to a hard disk drive (HDD) by use of a large data buffer, (2b) eliminating any reference to the HDD for instructions, and (2c) eliminating any microprocessor (in performance of MP3 encoding/decoding); (3) simultaneously reading cd-rom while encoding MP3 and writing a HDD, or reading the HDD and decoding MP3; (4) the retrospective selection of songs for recording; and (5) computerless high-speed transfer between MP3 player-recorders, commonly called a "bulk dump".

1. (Re-)Encoding an Audio Wave Form (For Later Playback) in a Longer Code Word, and Better Encoding Format, Than That Word and Format in Which the Audio Wave Form Was Initially Encoded In accordance with a first aspect of the present invention an audio wave form, normally music, is (re-)encoded (for later playback) in (i) a longer bit length code word, and/or (ii) a better encoding format, than that (i) word and (ii) format in which the audio wave form was initially encoded.

In particular, the audio wave form may arise from 1) first-converting, preferably in a D/A converter, a 16-bit first digital words encoded in the CD-ROM ISO standard. The 2) first playing is thus most preferably of a standard CD ROM. Meanwhile a simultaneous 3) second-encoding and re-digitizing of the (first-played) first audio signal is preferably into 24-bit MP3 format second digital words. These second digital words are 4) subsequent stored until, at a later second time, they are 5) decoded into a second analog signal, which is 6) second played.

In accordance with the present invention the bit length and/or the encoding/digitalizing standard of the second digital words is longer and/or better than are, respectively, the bit length or the encoding/digitalizing standard of the first digital words. Namely, and by way of example, the first digital words are most commonly a relatively shorter 16 bits per word, digitalized at the CD ROM ISO standard, while the second digital words are a relatively longer 24 bits each word, encoded at the superior MP3 standard.

The purpose of the unequal quality between the first and the second digital representations of the same analog wave form—most typically music—is that this wave form—this music—will sound different in a manner that is most commonly judged to be superior when it is (re-)rendered from digital words of longer bit length and/or better encoding/digitalizing standard. Music (re)rendered at both the longer bit length (24 bits versus 16 bits) and better standard (CD-ROM ISO versus MP3) is normally judged superior by both lay persons and musicologists. Quite unexpectedly, this is true even if—as in the scenario above—the second, higher quality, digital recording is made from an analog signal derived from the first, lower quality, digital recording.

The operation of this aspect of the present invention is thus somewhat akin to the digital re-mastering transpiring during the 1980–2000 time period of analog sound tracks first recorded in the 1900–1980 time period—but without any active filters typical of that process. The present invention is arguably a demonstration that "quality will out", or that "quality is its own reward", in rendering (and re-rendering) into audio the contents of, most typically, a CD ROM.

Of course if it becomes advantageous, either to reduce component cost or improve performance, the first-bit-length first-encoded first digital words can be encoded into the second-bit-length second-encoded second digital words without first converting the first digital words to an analog signal, and without then reconverting the analog signal back to digital in order to create the second digital words. This direct digital-code-word to digital-code word conversion is also enabled by the present invention.

2. Power Conservation in a Portable CD-ROM and MP3 Player-Recorder Through (1) Minimizing Data References to a Hard Disk Drive (HDD) by Use of a Large Data Buffer, (2) Eliminating Any Reference to the HDD for Instructions, and (3) Eliminating Any Microprocessor (In Performance of MP3 Encoding/Decoding)

In another of its aspects the present invention contemplates at least three schemes of power conservation, particularly in performance of the sequence 1)-6) above, so as to realize about six times less power consumption, and six times longer battery life, than heretofore.

2.1 Simple On/Off Control of Rotating Devices

Rotating devices in the form of (i) CD-ROM drives, and, because of the greater inertial mass of the platter(s) of most disk drives of 10+ Gbit capacity circa year 2001, (ii) Hard Disk Drives (HDDs), consume the most of the power in a portable CD-ROM and/or MP3 player/recorder. Needless to say, almost all modern CD-ROM and/or MP3 player/recorder shut these drives, either or both, down when they are not in use.

The way this works in the present invention is, however, specific to the functions performed. In accordance with the invention the 1) first-converting is of first digital words retrieved from a spinning (i) CD-ROM while the (ii) Winchester disk drive is stationary and idle, the 3) second-encoded and re-digitized second digital words being stored to the (iii) volatile memory. Later, the (ii) Winchester disk is rotated to receive, and for 4) storing, the second digital words from the (iii) volatile memory. Still later, the 5) second-converting is of these second digital words retrieved from a rotating (ii) Winchester disk, the (i) CD-ROM being stationary and idle.

2.2 A Large Data Buffer Permits But Infrequent Powering of Rotating Devices

The CD-ROM and MP3 player-recorder of the present invention goes further, however, in greatly reducing, or even eliminating, necessary reference(s) to, and powered operational periods of, its HDD.

In accordance with the present invention, a CD-ROM and/or MP3 player-recorder is possessed of a large semiconductor data buffer memory, preferably of the FLASH or DRAM types and most preferably about 16 Mbytes in size. Data, most normally digital audio data, read from a CD-ROM is—whether re-encoded (as in the present invention) or not—buffered in the buffer memory before being periodically recorded on the HDD. Normally about 3–4 complete songs can be buffered in the buffer memory before being recorded on the HDD. (If the human operator of the CD-ROM and MP3 player-recorder decides in the interim that he/she does not wish to record one or more songs, then the energy to do so need never be expended). Likewise, during playback from the HDD some 3–4 songs will be uploaded to the buffer memory in and as a high-speed data stream of, typically, some 2000 milliseconds (2 seconds), after which the HDD is powered down for, most typically, some 10 minutes.

2.3 Elimination of Instruction Storage in a HDD Rotating Device Further Prolongs Non-Operating Periods Still further in accordance with the present invention, full control of the digital data storage and playback processes is realized without necessity of any reference to the HDD for any instructions—of which there are none—used by any microprocessor—of which there is preferably none such. The preferred CD-ROM and MP3 player-recorder of the present invention happens to move digital data for all recording and playback purposes under control of a digital file manager and HDD controller chip that—although responding to a rudimentary and specialized instruction set architecture—does not require (for any purpose) that any of its instructions should be stored on the HDD. (Indeed, the HDD of the present invention contains no instructions; it contains 100% data.) However, the same function could be more conventionally realized by (i) a microprocessor chip executing (ii) firmware from (iii) volatile and (iv) non-volatile semiconductor memory. The reason that this does not happen—that it is not thought to keep the microprocessor from going to the disk drive for such process control purposes as mandate that the HDD be in constant rotation is because the microprocessor, or, more likely, a full-blown computer processor, is required to perform encoding and decoding to the MP3 standard. This leads us to the next aspect of the power-conserving scheme of the present invention.

2.4 Performance of MPE Encoding/Decoding in a Chip Eliminates a Microprocessor/Processor Running an Operating System Yet still further in accordance with the present invention, encoding of audio wave forms to the MP3 standard, and decoding of MP3 data to audio wave forms, is done in a new, but publicly available, chip developed in collaboration with the inventor of the present invention. It is the existence of this chip which frees any microprocessor—or, as is preferred in the present invention, a HDD controller and file management chip—to perform only file transfer, which, in accordance with the aspect of the present invention expounded in the previous paragraph, makes that no instruction references need be made to the HDD. Moreover, and importantly, moving the MP3 encoding/decoding to a (new) specialized chip itself serves to get rid of an incredible amount of energy-intensive (micro)processing. The final power-saving strategy of the present invention thus involves the elimination of at least a microprocessor, and more commonly an entire computer processor running (in order to realize MP3 compression/decompression) an operating system.

3. Simultaneously (1a) Reading CD-ROM, (1b) Encoding MP3 and (1c) Writing HDD; or (2a) Reading HDD and (2b) Decoding MP3; to Play In yet another of its aspects the present invention contemplates MP3 Encoding simultaneously with reading a CD-ROM (for where the audio wave form that is MP3 encoded originally comes) and writing a HDD (to where the MP3 encoded code words ultimately go). Alternatively, and complimentarily, the present invention contemplates reading a HDD of MP3 code words, and decoding the MP3 code words so read. The process sequence is not novel; any Pentium-class (Pentium is a trademark of Intel Corporation) computer or equivalent running a multi-tasking operating system would be expected to be able to accomplish as much.

However, the a portable CD-ROM and MP3 player-recorder in accordance with the present invention accomplishes as much with no microprocessor/processor and no operating system at all.

The present invention is embodied in a method and an apparatus for, on the one hand, 1) first-converting at a first time successive first-bit-length first-encoded first digital words to a first analog signal, and 2) first playing at the first time this first analog signal through speakers or headphones or the like to the human ear, should be conducted simultaneously with, on the other hand, 3) second-encoding and re-digitizing, preferably at the first time, this first analog signal into a successive second-bit-length second-encoded second digital words, and 4) storing these second digital words. The 1) first-converting is preferably of first digital words read from a CD-ROM. The simultaneous 3) second-encoding and re-digitizing of the second digital words is preferably in the MP3 format, with these MP3 format second digital words stored in a volatile memory of, most preferably, the FLASH, DRAM or SRAM types.

In a complementary usage, and application, the same method, and apparatus, is adaptable to simultaneously 1) read successive MP3 encoded digital words from a HDD into a buffer memory, 2) decode the MP3 encoded disk words read from the buffer memory into an analog signal, and 3) play this analog signal through speakers or headphones or the like to the human ear.

4. Retrospective Selection of Songs for Recordinq

The present invention yet still further contemplates that selection of songs for recording may be done retrospectively, and during play of the songs or even after the songs have been played.

In accordance with the present invention, (1) first digital data encoding, most typically, a musical work, normally a song, is read from a CD-ROM, (2) converted to an analog signal, (3) played through speakers or headphones or the like to the human ear, (4) second-encoded and re-digitized into second digital data, and (5) stored in a buffer memory of greater capacity than is the collective second digital data of the song; all within a CD-ROM and MP3 player-recorder. Conditional upon (i) predetermined settings by a human user of the CD-ROM and MP3 player-recorder, and/or (ii) intervention by the human ruler to overrule the predetermined settings, (iii) the second digital data associated with an individual musical work, or song, either will or will not be moved from the (5) buffer memory to be (6) stored in a mass memory, preferably a Winchester disk. The time that the second digital data is resident in the buffer memory accords the human user a window of opportunity to accept or reject, instigate or deny, recording of the individual musical work, or song.

5. High-Speed RIP of a CD/ROM

The present invention yet still further contemplates the high-speed rip of a CD/ROM into MP3 format files stored upon a HDD. Amazingly, this is realizable in a portable, battery powered, combination CD-ROM and MP3 player-recorder In the first place, since the CD-ROM must be, and is, spun at 4× to 6× normal speed, it uses even more energy than normal. In accordance with the power management aspects of the present invention, a large buffer memory prevents that the CD/ROM is unduly often, or unduly long, spun. This same buffer memory now serves a new purpose of holding the ISO format CD/ROM digital words until, upon conversion to audio or directly in digital format, they are converted into MP3 format. Luckily the MP3 encoder(/decoder) chip runs in excess of real time play rates, and necessary conversions are soon done. Even then, however, the newly encoded MP3 data is not put onto the HDD until a sufficient accumulation thereof warrants spinning up, and writing, the HDD.

5. Computerless High-Speed Transfer of MP3 Files Between Like MP3 Player-Recorders The present invention contemplates support for the high speed transfer of MP3 files between like MP3 player-recorders, normally over Universal Serial Bus (USB) or an infrared link or a like communications link, by, primarily, the use of a buffer. As in other aspects of the present invention, the versatile buffer memory of the present invention permits that processes not precisely exactly synchronized nor at the same rate may nonetheless transpire on a handshake, request-acknowledge, basis to move copious amounts of (MP3) information in short time and, equally importantly, with but minimal use of energy.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow.

DESCRIPTION OF THE PREFERRED EMBODIMENT

Figure 1:
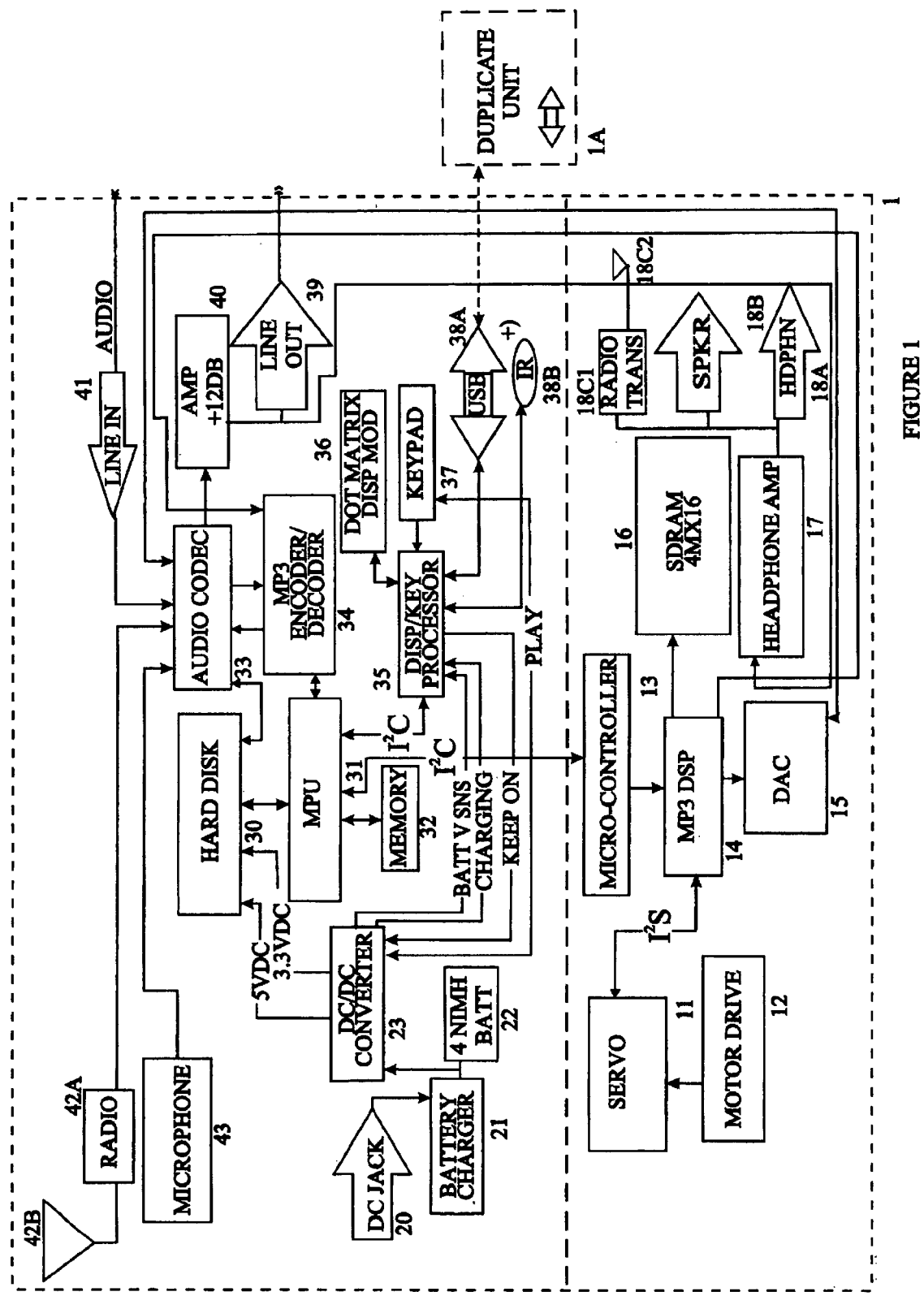
FIG. 1 is a schematic diagram of the preferred embodiment of a portable combination CD/ROM and MP3 recorder-player in accordance with the present invention.

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

The music and audio recorder/player system, or device, in which the present inventions are embodied incorporates (i) a CD Drive, (ii) a Hard Disk Drive (HDD) storage device, (iii) a high-speed volatile semiconductor memory, and (iv) a user interface.

In use a human operator takes a standard audio CD and inserts it into a standard CD reader only device. Through this device the operator using the operating interface selects either one song, or all songs, to be played from the CD. After song selection the songs are played—which, in a manner opaque to the user, involves decoding the ISO standard digital code words of the CD, and producing an analog wave form that is transduced into audible sound—concurrently that the songs are ultimately stored to a Hard Disk Drive (HDD). Although a HDD of a conventional, Winchester, type currently (circa 2001) benefits from a much greater storage capability than alternative non-volatile memory products (such as are available from SanDisk and others), alternative stores can be used in place of the HDD. Such alternatives are, in fact, preferred in extremely harsh physical environments where the more fragile HDD may be damaged.

Also opaque to the user, this storage involves (i) compressing the analog wave from into MP3 format code words, (ii) storing these code words in a buffer memory, and then, when most typically several songs have been stored in the buffer, (iii) writing all, or such of the songs as are then selected, to the HDD.

Accordingly, when the user-operator wishes to hear a song, then he/she chooses the song from an operator interface play list. After the song is chosen the song file is uploaded to a volatile solid-state memory, and since this memory is solid state the song file may be played with no interference from any vibration. The playing of the song from the CD involves converting it from a digital format to an analog signal, and sending the analog signal to an audio preamplifier and, ultimately, to speakers or to headphones. The operator has a choice when first selecting songs from the CD to either download to the hard drive in real-time (while the song is playing) or at a speed of 5 to 1 with no audio playback. Operation of the recorder/player device does not require any presence, or operational knowledge, of a personal computer, the device operating essentially the same as a standard audio CD player.

1. User Interface and Logic Control Circuit

Control of the components is achieved through a proprietary logic control and user interface that provides access to the "keyboard" and "display" functions of the audio player. This system incorporates a main menu/sub-menu structure.

The Main Menu Selections are: 1) Play, 2) Record, 3) Favorites, 4) Radio, and 5) Sound. Selection among these alternatives preferably gives rise to 1) an associated alphanumeric display of at least 2 lines, plus 2) an indication that "time" can be selected, and incremented/decremented, by user manipulation of a physically proximate associated front panel button/control, plus 3) an indication that "sub-commands" can be selected, and entered, by user manipulation of another physically proximate and associated front panel button/control, and 4) an indication that the other selections 1)-3) can be "locked", and acted upon, by user manipulation of yet another physically proximate and associated front panel button/control. In simplest terms, selection from the main menu does no more than adapt the user interface to prompt the user to select, and to make, still further control inputs.

For example, the preferred "time" sub-menu displays "?-/+?", with obvious effect upon user manipulation.

For example the preferred "lock" sub-menu displays "?/? Store", with obvious consequences should the user activate the corresponding button/control/.

By far the most complex sub-menu is that for commands. Should 1) Play be selected on the main menu, then the Play commands sub-menu then appearing will preferably show a series of alternatives: Play ?, Stop |, Fast Fwd >, Reverse <, Track Forward >>, Track Back <<, and Pause #.

Should 3) Favorites be selected on the main menu, then the Record commands sub-menu then appearing will preferably show a series of alternatives: Deejay random play, Play-List, Last, Add, and Delete.

Similarly, should 4) Radio be selected on the main menu, then the Radio commands sub-menu then appearing will preferably show a series of alternatives: AM, FM, Tune -/+ with sub-sub-menus Scan </> and Seek <</>>, and Memory with sub-sub-menus Add + and Del -.

Finally, should 5) Sound be selected on the main menu, then the Sound commands sub-menu then appearing will preferably show a series of alternatives: EQ equalizer, Bass -/+, Treble -/+, Balance -/+, Fader -/+, and Memory.

2. Preferred Embodiment of a Portable Combination CD/ROM and MP3 Recorder-Player in Accordance with the Present Invention FIG. 1 is a schematic diagram of the preferred embodiment of a portable combination CD/ROM and MP3 recorder-player in accordance with the present invention.

The elements of the recorder-player below the horizontal dashed line are substantially pre-existing and conventional; the added elements of the present invention are substantially shown above the horizontal dashed line. Below the horizontal dashed line a Motor Driver 12, preferably type MM1538 or FAN8038, powers rotation of a CD-ROM (not shown) so that a Servo 11, preferably type CXA2550, CXD3068 OPU (KSM900), under control of a Micro-controller 13, will deliver, during rotation of the CD/ROM digital data in the form of ISO CD/ROM code words to the digital signal processor MP3 DSP 14, preferably type RSM88131A or TR2101. The entire CD mechanism may be, for example, Sanyo type DA23.

The digital data from the CD/ROM is buffered in a memory SD RAM 16, preferably of size 4M words of 16 bits each (NOTE: this buffer memory should not be confused with the buffer Memory 32). Decoded digital data—representing an audio wave form—from the MP3 DSP goes to audio digital-to-analog converter DAC 15, preferably type WM8725 or AK4352, and also to MP3 Encoder/Decoder 34 which is a new chip type YMPC-3001 from Yountel of Korea further discussed elsewhere in this specification.

Meanwhile, an audio signal from the DAC 15 goes to audio companding de-companding circuit Audio CODEC 33, preferably type UDA1342TS from Philips.

The elements added to this base structure of a CD/ROM reader in order to realize the combination CD/ROM and MP3 recorder-player in accordance with the present invention are next introduced in the context of the functions that, at various times and under various user/operator control, that these elements serve to perform. One function, and operational mode, of the combination CD/ROM and MP3 recorder-player is called "play, and record from analog". The paths, and the related elements, primary in this operation are high-lighted in darkened line in FIG. 2a. The audio signal from the DAC 15 received in Audio CODEC 33 is directly routed to Amplifier 40 of nominal 12 db gain, and then to Headphone Amp 17, and then for play to any of (i) Headphone 18a, and/or (ii) Speaker 18c1, and/or (iii) through Radio Transmitter 18d1 and antenna 18d2 via a low power radio signal (preferably FM) to a proximate radio (not shown) for reception and play through the sound output system of the radio. Meanwhile this audio signal is also passed through the Audio CODEC 33 to the MP3 Encoder/Decoder 34 where it is encoded to MP3 code, preferably at a 24 bit code word bit length.

The MP3 encoded data is passed though the file management unit MPU 31—a custom chip for which may be substituted for purposes of the present invention a microprocessor—first to the buffer Memory 32, which is preferably of the FLASH or DRAM types. When the buffer Memory 32, which is preferably 64K or larger in size, becomes filled, then its contents (such as are then selected for permanent recording) are moved en masse through and by the MPU 31 to the Hard Disk 30, which is preferably of the Winchester type, and is more preferably a magnetic disk of 10 Gbyte or greater capacity.

At the conclusion of the "play, and record from analog" operation, the audio CD/ROM has been played, and MP3 encoded data in respect of the contents thereof the CD/ROM lodged on the Hard Disk 30.

Another, similar, function, and operational mode, of the combination CD/ROM and MP3 recorder-player is called "play, and record from digital". The paths, and the related elements, primary in this operation are high-lighted in darkened line in FIG. 2b. The digital signal (reflective of an analog audio wave form) from the MP3 DSP 14 bypasses Audio CODEC 33 and is sent to MP3 Encoder/Decoder 34. The decoding of this signal to analog audio is sent to the Audio CODEC 33 and then to the Amplifier 40 and so on, meaning to the Headphone Amp 17, and then for play to any of (i) Headphone 18a, and/or (ii) Speaker 18c1, and/or (iii) through Radio Transmitter 18d1 and antenna 18d2 via a low power radio signal (preferably FM) to a proximate radio (not shown) for reception and play through the sound output system of the radio.

Meanwhile the MP3 encoded data from the MP3 Encoder/Decoder is sent to the MPU 31 where it essentially undergoes the same treatment as it was previously. Namely, it is passed first to the buffer Memory 32 and then, when the buffer Memory 32 becomes filled, the MP3 data is moved en masse through and by the MPU 31 to the Hard Disk 30, where it is stored.

Accordingly, at the conclusion of the "play, and record from digital" operation, the audio CD/ROM has again been played, and MP3 encoded data in respect of the contents thereof of the CD/ROM has again become lodged on the Hard Disk 30.

Figure 2A:
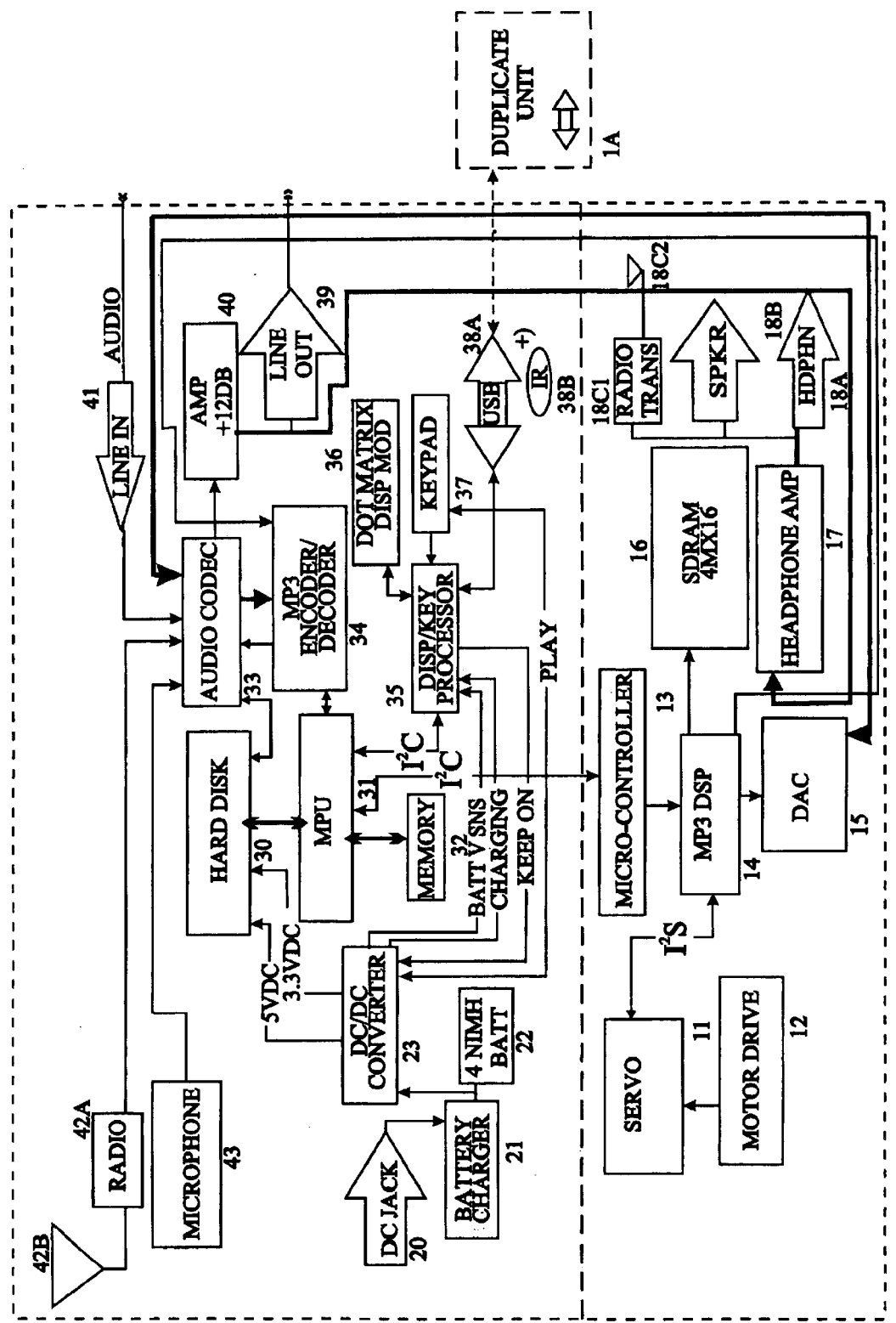
FIG. 2a is the schematic diagram of the preferred embodiment of a portable combination CD/ROM and MP3 recorder-player in accordance with the present invention previously seen in FIG. 1 marked so as to highlight certain paths involved in the "play, and record from analog" operational mode of the player-recorder.
Figure 2B:
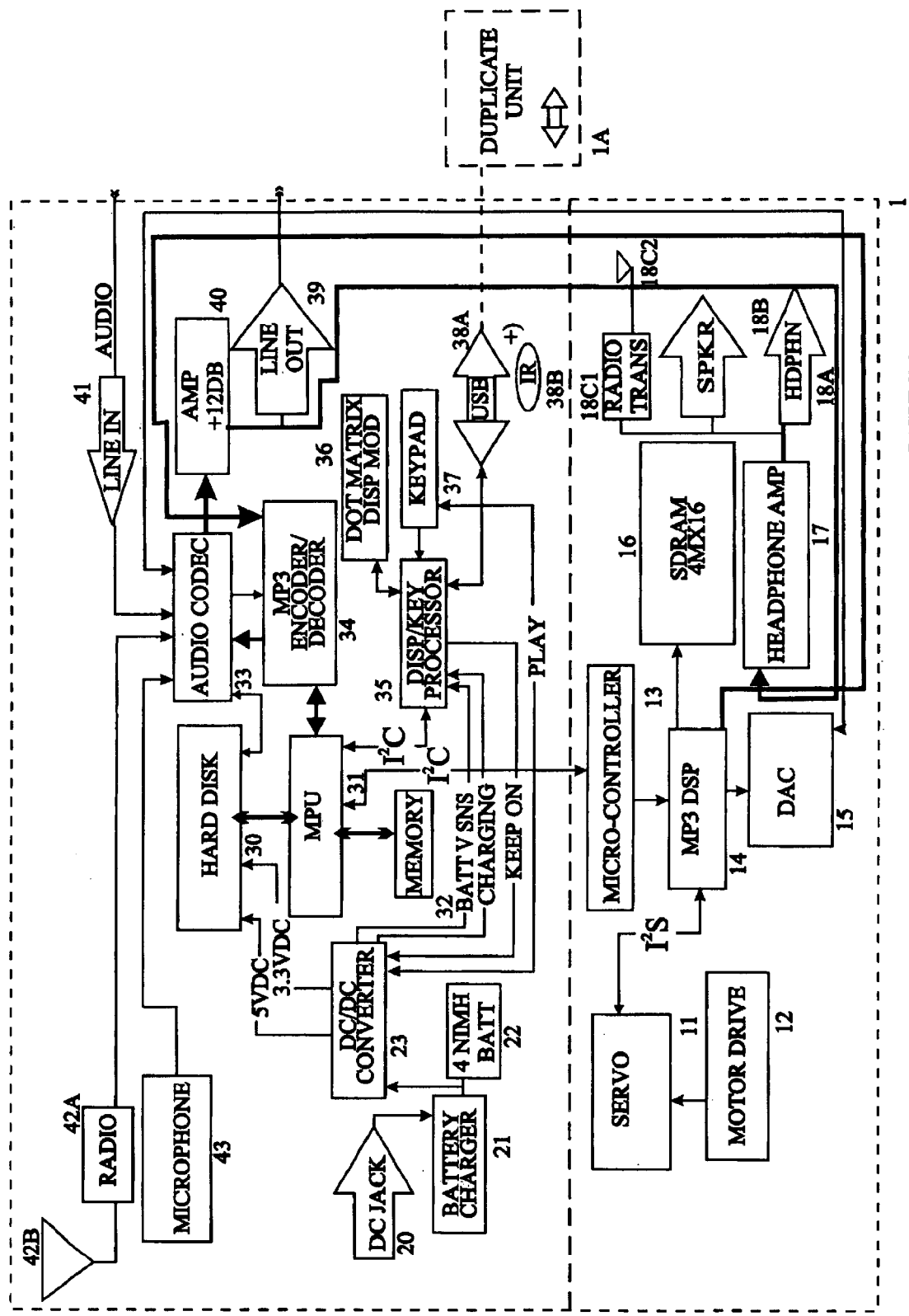
FIG. 2b is the schematic diagram of the preferred embodiment of a portable combination CD/ROM and MP3 recorder-player in accordance with the present invention previously seen in FIG. 1 marked so as to highlight certain paths involved in the "play, and record from digital" operational mode of the player-recorder.

Both the "play, and record from analog" operational mode illustrated in FIG. 2*a*, and, more preferably, the "play, and record from digital" operational mode illustrated in FIG. 2*b* can be replicated in a "Program" mode where (i) audio play is disabled and, as a consequence that the information ultimately retrieved from the CD/ROM need not be played in real time, (ii) the entire process of MP3 encoding and storage may be run faster, essentially as fast as the weakest link in the chain of reads, decodes and/or conversions, and writes will run. Normally the weakest link is the CD/ROM, which is then spun at 4× to 6× normal speed. Because of settling time in the de-companding circuits of the CODEC 33, it is preferred that the MP3 encoded data be developed in and by the "record from digital" operational mode.

Figure 3:
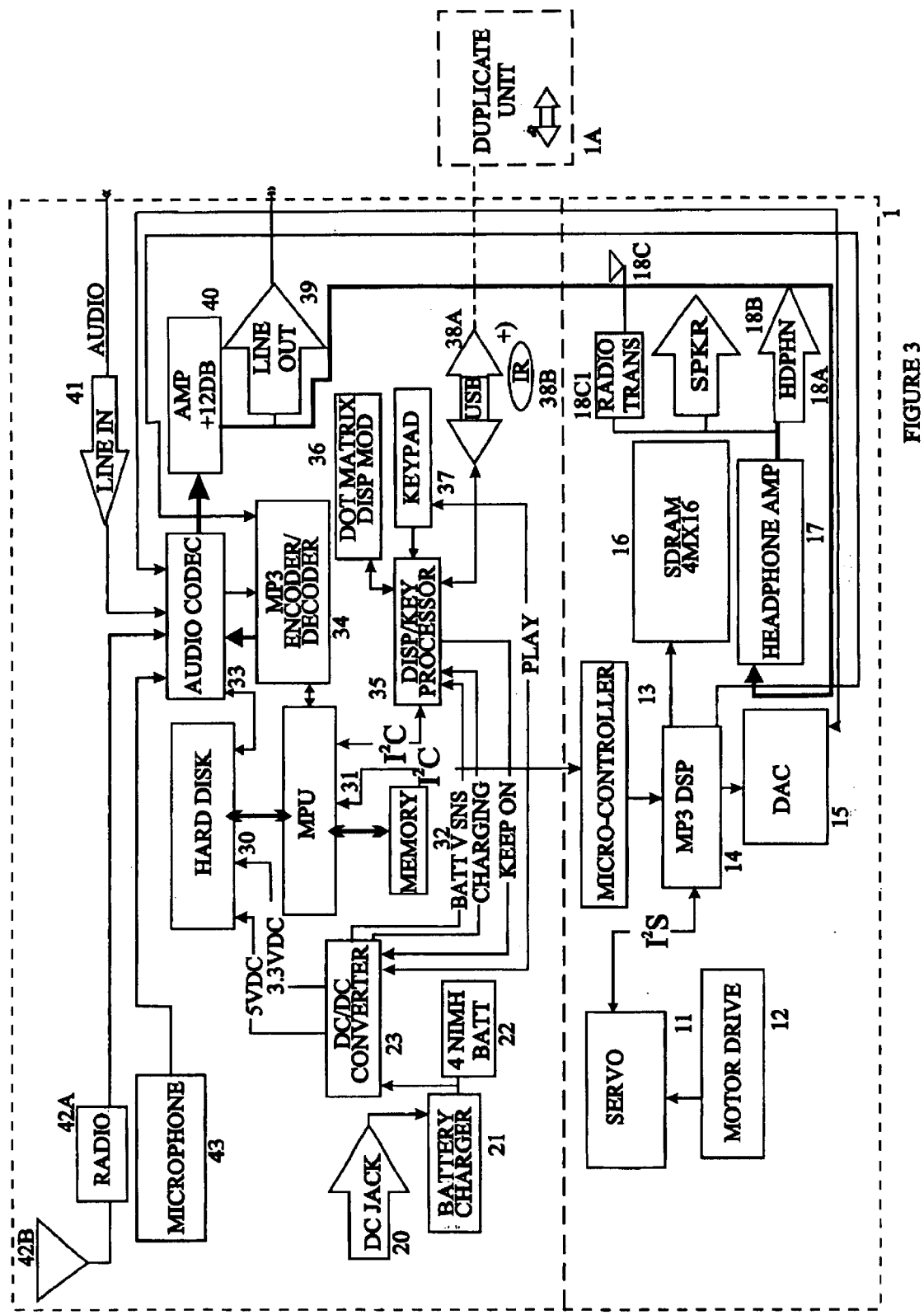
FIG. 3 is the schematic diagram of the preferred embodiment of a portable combination CD/ROM and MP3 recorder-player in accordance with the present invention previously seen in FIG. 1 marked so as to highlight certain paths involved in the "playback of MP3 from the hard disk" operational mode of the player-recorder.

The entire purpose of logging MP3 data to the Hard Disk 30 has been, or course, to provide for later retrieval and play. The path for so doing is high-lighted in FIG. 3, which is the same schematic diagram of the preferred embodiment of a portable combination CD/ROM and MP3 recorder-player in accordance with the present invention previously seen in FIG. 1 now marked so as to highlight certain paths involved in the "playback MP3 from hard disk" operational mode of the player-recorder. During playback the MP3 data from the Hard Disk 30 is extracted to, through, and by the MPU 31 to the buffer Memory 32. The MPU 31 also serves to issue successive MP3-encoded data words to the MP3 Encoder/Decoder 34 now acting as an MP3 decoder. The MP3 data decoded to a companded and encoded audio signal is sent to the Audio CODEC 33 where it is de-companded and further decoded to produce the pure audio signal sent to the Amplifier 40. As is by now understood, the path of the audio signal from the Amplifier 40 ultimately permits that it is transduced to sound in, by way of example, Headphone 18*a*.

Figure 4:
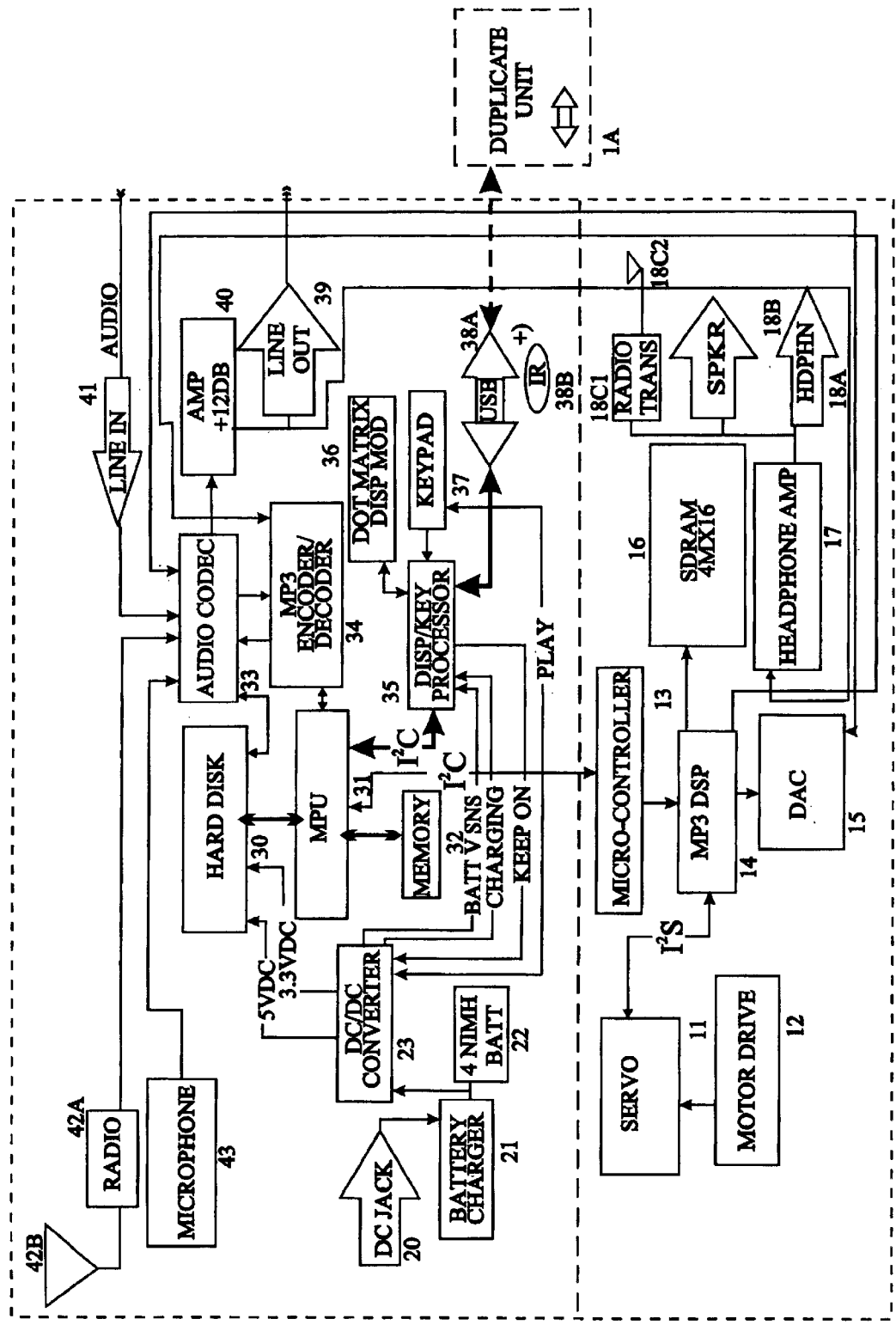
FIG. 4 is the schematic diagram of the preferred embodiment of a portable combination CD/ROM and MP3 recorder-player in accordance with the present invention previously seen in FIG. 1 marked so as to highlight certain paths involved in the "program mode MP3 data interchange" operational mode of the player-recorder.

The portable combination CD/ROM and MP3 recorder-player in accordance with the present invention may transfer MP3 data to a like unit—normally over a code-word or otherwise protected proprietary transfer-level-protocol-protected interface—to an identical, or like, unit. The path for so doing is highlighted in FIG. 4. MP3 data from the Hard Disk 30 is transferred by action of MPU 31 to be buffered in buffer Memory 32 and then, as called for by Display/Keyboard Processor 35—which manages the Universal Serial Bus 38*a*, or the Infrared Transceiver 38*b* for purposes of data transfer to the other device—to the Display/Keyboard Processor 35 and to the Duplicate Unit 1*a* over, by way of example, a Universal Serial Bus 38*a* or an Infrared Transceiver 38*b*.

Needless to say, this transfer can be very fast, up to 10 Mbits/second. Accordingly large numbers of tracks of musical works which are stored in MP3 (or related) compressed format on the Hard Drive 30 of one unit may be transferred (i) in gross, (ii) in accordance with a "transfer list" analogous to a "play list", (iv) as differing in title, or (v) track by track under user control, to the Hard Drive 30 of the other unit. The transfer mode (iv) is especially powerful, permitting a user/operator/owner with a virgin Hard Drive but access to another fully populated CD/ROM and MP3 recorder-player in accordance with the present invention (such as might be owned by a friend) to load large numbers of musical works, typically up to the approximately 1200 that will fit within a 10 Gbit disk storage, to his/her unit in mere minutes.

Additional elements shown in the schematics of FIGS. 1–4 will be substantially self-explanatory to a practitioner of the electronic music system design arts. Power is normally supplied through three separate options: 1) 110–220 volt a.c. input, 2) a battery jack, or 3) batteries. Inputs to the Audio CODEC 33, and associated operational modes, are provided to digitalize (to MP3 format) and record audio information both from a Radio 42*a* (using an antenna 42*b*) and a Microphone 43. The Keyboard/Keypad Processor 35 manages the power selection and control, and the operator interface via the Keypad 37 and the Dot Matrix Display Module 36. An output port for the audio signal is provided through plug jack Line Out 39.

2. The Preferred MP3 Encoder/Decoder

The MP3 Encoder/Decoder 34 is type YMPC-3001 made by Yountel corporation of Korea, appearing on the World Wide Web at www.yountel.com <http://www.yountel.com>, supported by technology of the Control and Measure Engineering Department of Young KANGWON University, Korea.

The MP3 Encoder/Decoder 34 produces MP3 encoding at 24 bits, and decodes MP3 codes up to 24 bits. It can encode analog sound to an MP3 file in real time. It has the same sampling frequency as a CD (i.e., 44.1 KHz) with 24-bit grade-level Digital Signal Processing (DSP) core heretofore this chip believed by the manufacturer thereof (i.e., Yountel) to have been realized only at the laboratory level, and never in a commercial product.

The YMPC-3001 has 3.3 V digital circuitry; a serial audio interface in the ESAI standard; a MICOM Interface; and a byte-wide parallel host interface. The power consumption is 85 mA for encoding (nominal mode) and 40 mA for decoding (nominal mode), with a dowered down consumption of <100 uA in Stop Mode. The chip control accepts a Sync Recording ON/OFF signal. The chip is basically a 24-bit high-performance digital signal processor built into a 144-pin plastic TQFP package.

The decoding capabilities of the YMPC-3001 include MPEG 1 Layer 3 and MPEG 2 Layer 3 bit streams, 24-bit D/A Convertor adopted. For bitstream decoding, the bitstreams can be transmitted from Flash memory, smart card or other physical devices. Digital equalization may be selected from among classical, jazz, pop, rock, and techno-digital bass settings.

The decoding capabilities of the YMPC-3001 are based on a 24 bit, 44.1 Khz sampling A/D Converter adopted to accept an analog audio input signal with the digital output code words being stored to and in a Flash memory or smart card of the like. During use for voice recording the MP3 format is used with a fs=16 Khz Mono/16 KBps.

Optional functions available for the YMPC-3001 include a USB interface, an ECP interface, digital input(s), a Smart Card interface, and a Flash media interface.

In accordance with the preceding explanation, variations and adaptations of the combination CD-ROM and MP3 recorder/player in accordance with the present invention will suggest themselves to a practitioner of the data compression and decompression, and the audio recording and playback, arts.

For example, the Hard Disk 30 could be replaced with any mass memory store, as previously discussed.

For example, the MP3 encoding format (or more completely MPEG-½ Layer-3) is just one data compression format that can be used with the methods, and in the player/recorder device, of the present invention. The player/recorder of the present invention will benefit from use of the new (circa 2001) WMA encoding format (as encoding hardware becomes available) due to its even greater data compression (the corresponding song files size is smaller) and greater audio quality. It is safe to predict that there will be still other advances in encoding technology, and the present invention will benefit from these advances by simple upgrade of the encoding/decoding IC's as they become available.

According to these differences in mere terminology, the named elements and process steps of the following claims should be broadly interpreted.

Moreover, in accordance with these and other possible variations and adaptations of the present invention, the scope of the invention should be determined in accordance with the following claims, only, and not solely in accordance with that embodiment within which the invention has been taught.

What is claimed is:

1. A method, performed in a combination CD-ROM and MP3 recorder/player, of recording sound comprising:
    playing a CD-ROM by
        first-decoding first digital words of n bits each first digital word, which said first digital words are encoded a CD-ROM ISO standard, into a first analog audio wave form, and
        converting the first analog audio wave form to sound; while
    storing the contents of the same CD-ROM by
        encoding and digitizing the first analog audio wave form into MP3-format second digital words, which said second digital words are of m bits each word, m>n, and
        storing the second digital words in a memory.

2. The method according to claim 1 wherein m=16 and n=24.

3. The method according to claim 1 further comprising:
    playing back the stored contents of the CD-ROM, after the storing of the second digital words by
        reading the second digital words from the memory,
        second-decoding the second digital words into a second analog audio wave form, and
        converting the second analog audio wave form to sound.

4. A combination CD-ROM and MP3 recorder/player comprising:
    a reader of ISO standard first digital code words of n bits each word from a CD-ROM;
    a first decoder first-decoding the first digital code words of n bits each word into a first analog audio wave form;
    an audio transducer converting the first analog audio wave form to sound;
    an encoder and digitalizer decoding and digitalizing the first analog audio wave form into MP3 format second digital words of m bits each word, m>n; and
    a memory storing the second digital words.

5. The combination CD-ROM and MP3 recorder/player according to claim 4 further comprising:
    a reader of the second digital code words from the memory; and
    a second decoder second-decoding of the second digital words into a second analog audio wave form;
    wherein the audio transducer also converts the second analog audio wave form to sound.

6. A method of conserving power in a combination CD-ROM and MP3 recorder/player, the method comprising:
    playing a rotating CD-ROM containing a plurality of musical works by
        first-decoding first-format first digital words encoded in the CD-ROM into a first audio wave form, and
        converting the first audio wave form to sound; while
        encoding and digitizing the first audio wave form into second-format second digital words;
    storing so many of the second digital words as represent at least a complete one of the plurality of musical works into a semiconductor memory; and then, when and only when at least one complete musical work is stored in the semiconductor memory,
    powering up a rotating disk to spin up to recording speed, and recording the at least one complete musical work from the semiconductor memory to the rotating disk, whereupon the rotating disk is powered down;
    wherein the disk is not rotating during a portion of the playing, the encoding and digitalizing, and the storing, and thus saves power over a constant rotation.

7. The method of conserving power according to claim 6 further comprising:
    powering up the rotating disk to spin up to reading speed, and transferring at least one complete musical work from the rotating disk to the semiconductor memory to the rotating disk, whereupon rotating disk is powered down;
    reading the second digital words from the semiconductor memory;
    second-decoding the second digital words into a second audio wave form;
    converting the second audio wave form to sound; and
    continuing with powering up the rotating disk and the transferring, followed by the reading and the second-decoding and the converting, as becomes periodically required to play successive musical works from the rotating disk;
    wherein, nonetheless to storing so many second digital words as represent at least a complete one of the plurality of musical works, the rotating disk is not continuously rotating during playing of the at least one musical work, and to that extent saves power.

8. A power-conserving combination CD-ROM and MP3 recorder/player comprising:
    a CD-ROM containing a plurality of musical works;
    a first decoder first-decoding first digital words encoded in the CD-ROM into a first audio wave form;
    a converter converting the first audio wave form to sound;
    an encoder/digitalizer digitalizing and encoding the first audio wave form into second digital words;
    a solid state memory storing so many of the second digital words as represent at least a complete one of the plurality of musical works;
    a rotating disk controllable to record at least one complete musical work from the semiconductor memory; and
    a disk power controller for spinning up the disk to recording speed for purpose of recording from the memory second digital code words representing the at least one musical work, and for thereafter powering down the rotating disk;
    wherein the disk is not continuously rotating during the converting of the first audio wave form to sound, and the digitalizing and the encoding, and thus saves power.

9. A method of conserving power in a combination CD-ROM and MP3 recorder/player, the method comprising:
    performing MP3 encoding in an MP3 encoder without reference to any instructions or microcode stored in any memory;

storing in a solid state buffer memory so many MP3 codes, as and when produced by the MP3 encoder, as represent a complete musical work; and spinning up a read-writable disk memory, then writing the MP3 codes from the solid state buffer memory to the disk memory, and then powering down the disk memory;

wherein the disk is not continuously rotating during the MP3 encoding and thus saves power.

10. The method according to claim 9 wherein the MP3 encoder chip is also a decoder chip, the method further comprising:

spinning up the read-writable disk memory, writing the MP3 codes from the disk memory to the solid state buffer memory, and powering down the disk memory;

storing in the solid state buffer memory so many MP3 codes, as and when read from the disk memory, as represent a complete musical work; and performing MP3 decoding in the MP3 encoder-decoder on the MP3 codes stored in the buffer memory without reference to any instructions or microcode stored in any memory;

wherein the disk is not continuously rotating during the MP3 decoding and thus saves power.

11. In a combination CD-ROM and MP3 recorder/player playing a CD-ROM by
reading first digital code words from a CD-ROM,
first-decoding the first digital words into a first audio wave form, and
converting the first audio wave form to sound; while
encoding and digitizing the first audio wave form into second digital words, and, ultimately,
storing the second digital words in a disk memory,
a method of conserving power comprising:
performing the first-decoding, and the encoding and digitalizing, entirely within one or more chips without reference to any memory to retrieve any instructions or microcode,
neither the first-decoding nor the encoding being performed by a microprocessor,
the one or more chips being encoders, decoders or encoder/decoders,
moving encoded and digitalized second digital words from the one or more chips to the disk memory without use of any device making reference to any memory for any instructions or microcode as to how to effectuate this moving,
wherein the moving is not performed by a microprocessor, but by a state machine or file transfer device.

12. A method of recording in a combination CD-ROM and MP3 recorder/player, the method comprising:
reading at a first time successive first-encoded first digital words from a CD-ROM;
decoding at the first time the successive first-encoded first digital words into a first analog signal;
transducing at the first time this first analog signal into audible sound;

encoding and digitizing at the first time the first analog signal into a successive second-encoded second digital words;

storing these second digital words in a solid state memory until at least one entire musical work is stored in the solid state memory;

presenting to a user of the combination CD-ROM and MP3 recorder/player an opportunity to save or reject saving the at least one entire musical work; and IF the user rejects any saving of the at least one entire musical work THEN returning immediately to the reading, the decoding, the encoding and digitalizing, and the storing or if the user selects saving of the at least one entire musical work THEN moving second digital code words associated with the musical work to a writable disk and thereafter returning immediately to the reading, the decoding, the encoding and digitalizing;

wherein the user is able to select saying of the at least one musical work on the writable disk at a time following the transducing of the work into audible sound.

13. A method of extracting digital files upon a CD/ROM into MP3 format files stored on a hard disk drive, the method comprising:
reading digital data from a CD-ROM at greater than normal CD/ROM play speed;
first-buffering the read digital data in a first buffer memory;
encoding in an MP3 encoder chip at greater than real-time play rates information from or derived from the digital data of the first buffer memory into MP3 files;
second-buffering the encoded MP3 files in a second buffer memory; and
writing in batches, at combined rates greater than real-time play rates, the encoded buffered MP3 files from the second buffer memory onto a hard disk drive;
wherein the transfer from the CD-ROM to, ultimately, the disk drive is at rates, in aggregate and on average, greater than the real-time play rate.

14. The method according to claim 13 wherein the first-buffering and the second-buffering are into a same buffer memory.

15. A method of transferring MP3 files directly between MP3 player-recorders comprising:
reading MP3 data from a hard disk drive of a first MP3 player-recorder into a buffer memory of a first player-recorder;
transferring MP3 data from the first player-recorder's buffer memory across a communications channel to a like buffer memory of a second MP3 player-recorder; and
writing MP3 data from the second player-recorder's buffer memory to a hard disk drive of the second MP3 player-recorder;
wherein no computer processor is anywhere involved to manage, perform or in any way contribute to any of the reading and the transferring and the writing.

* * * * *